US010066951B2

(12) United States Patent
Katsuki et al.

(10) Patent No.: US 10,066,951 B2
(45) Date of Patent: Sep. 4, 2018

(54) INFORMATION PROCESSING DEVICE, INFORMATION PROCESSING METHOD, AND MOVING BODY

(71) Applicant: Kabushiki Kaisha Toshiba, Minato-ku (JP)

(72) Inventors: Rie Katsuki, Kawasaki (JP); Tsuyoshi Tasaki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/440,547

(22) Filed: Feb. 23, 2017

(65) Prior Publication Data
US 2018/0051996 A1 Feb. 22, 2018

(30) Foreign Application Priority Data
Aug. 18, 2016 (JP) ................. 2016-160602

(51) Int. Cl.
*B60W 30/12* (2006.01)
*B60W 10/06* (2006.01)
*B62B 13/00* (2006.01)
*G01C 21/34* (2006.01)
*G01C 21/36* (2006.01)
(Continued)

(52) U.S. Cl.
CPC ....... *G01C 21/3415* (2013.01); *B60W 30/095* (2013.01); *G01C 21/26* (2013.01); *G01C 21/3407* (2013.01); *G01C 21/3629* (2013.01); *G01S 19/42* (2013.01); *G05D 1/0088* (2013.01)

(58) Field of Classification Search
CPC ............ G01C 21/3415; B60W 10/06; B60W 50/0097; B60W 30/12; G05D 1/024; G05D 1/0246; G05D 1/0265; G08G 1/167; A01B 69/008; B62D 13/00; B60Q 1/346; G06K 9/00791
See application file for complete search history.

(56) References Cited

U.S. PATENT DOCUMENTS 4,486,694 A * 12/1984 Ohba ................. G05D 1/0265
180/168
5,145,198 A * 9/1992 Vanninmaja ........... B62D 13/00
280/103
(Continued)

FOREIGN PATENT DOCUMENTS

CA     2380048 A1 *  2/2001  .......... G05D 1/0246
EP   1 873 495 A1     1/2008
(Continued)

*Primary Examiner* — Yuri Kan
(74) *Attorney, Agent, or Firm* — Oblon, McClelland, Maier & Neustadt, L.L.P.

(57) ABSTRACT

An information processing device according to an embodiment has a recommended route generation function. The recommended route generation function generates a recommended route with a changed section involving a change in a traveling direction within a predetermined range on a scheduled traveling route, the changed section including a first line and a second line. The first line continues to a first position at an entrance of the changed section. The second line continues to a second position at an exit of the changed section. The second line is longer than the first line. A tangential line of the second line and an exit line of the changed section forms an angle within a predetermined angle range.

21 Claims, 14 Drawing Sheets

(51) Int. Cl.
*G01S 19/42* (2010.01)
*B60W 30/095* (2012.01)
*G01C 21/26* (2006.01)
*G05D 1/00* (2006.01)

(56) References Cited

U.S. PATENT DOCUMENTS

| | | | | |
|---|---|---|---|---|
| 6,636,807 | B1 * | 10/2003 | Glasmacher | A01B 69/008 |
| | | | | 340/995.1 |
| 8,364,394 | B2 * | 1/2013 | Taguchi | B60W 10/06 |
| | | | | 701/117 |
| 9,045,144 | B2 * | 6/2015 | Schwindt | B60W 50/0097 |
| 2010/0204911 | A1 | 8/2010 | Taguchi | |
| 2011/0169958 | A1 * | 7/2011 | Imai | B60W 30/12 |
| | | | | 348/149 |
| 2012/0057749 | A1 * | 3/2012 | Takahashi | G08G 1/167 |
| | | | | 382/103 |
| 2013/0010484 | A1 * | 1/2013 | Son | B60Q 1/346 |
| | | | | 362/464 |
| 2014/0336844 | A1 | 2/2014 | Schwindt et al. | |
| 2014/0244114 | A1 * | 8/2014 | Matsubara | G05D 1/024 |
| | | | | 701/41 |
| 2016/0073062 | A1 * | 3/2016 | Ohsugi | G06K 9/00791 |
| | | | | 348/148 |

FOREIGN PATENT DOCUMENTS

| | | |
|---|---|---|
| EP | 2 896 937 A1 | 7/2015 |
| JP | 2000-122719 | 4/2000 |

\* cited by examiner

INFORMATION PROCESSING DEVICE, INFORMATION PROCESSING METHOD, AND MOVING BODY

CROSS-REFERENCE TO RELATED APPLICATIONS

This application is based upon and claims the benefit of priority from Japanese Patent Application No. 2016-160602, filed on Aug. 18, 2016; the entire contents of which are incorporated herein by reference.

FIELD

Embodiments described herein relate generally to an information processing device, an information processing method, and a moving body.

BACKGROUND

Automatic driving technologies for automatic steering of vehicles have been attracting attention. For example, driving assistance technologies based on environmental information around vehicles have been disclosed.

For example, Japanese Patent Application Laid-open No. 2000-122719 discloses a steering control technology for a vehicle based on a shape of a road ahead of the vehicle by the vehicle.

When a moving body such as a vehicle travels in a changed section involving a change in a traveling direction, a line of sight of a driver is preferably quickly directed toward an exit of the changed section. The conventional technologies fail to provide sufficient driving assistance covering the changed section involving a change in a traveling direction.

DETAILED DESCRIPTION

An information processing device according to an embodiment has a recommended route generation function. The recommended route generation function generates a recommended route with a changed section involving a change in a traveling direction within a predetermined range on a scheduled traveling route, the changed section including a first line and a second line. The first line continues to a first position at an entrance of the changed section. The second line continues to a second position at an exit of the changed section. The second line is longer than the first line. A tangential line of the second line and an exit line of the changed section forms an angle within a predetermined angle range.

An information processing device, an information processing method, and a moving body will be described in detail with reference to the attached drawings.

First Embodiment

Figure 1:
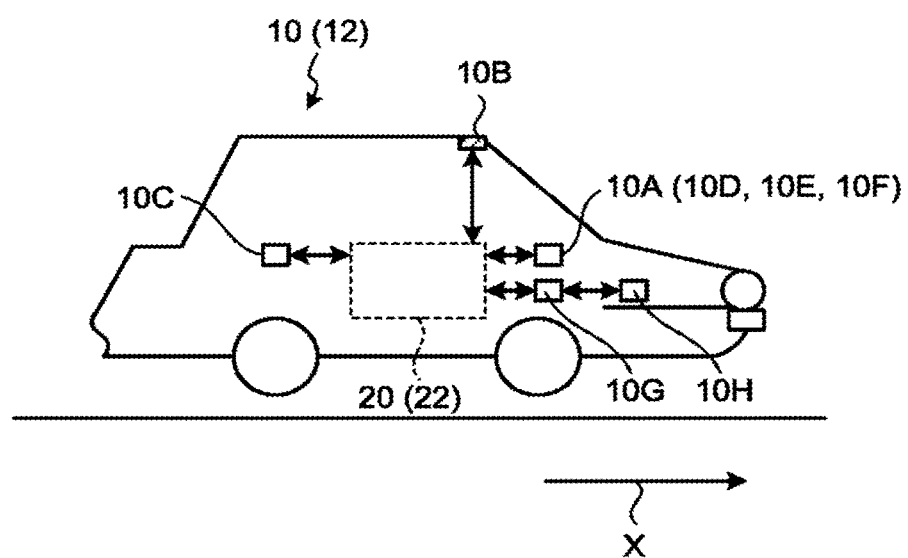
FIG. 1 is a diagram illustrating a moving body.

FIG. 1 is a diagram illustrating an example of a moving body 10 according to a first embodiment.

The moving body 10 includes an information processing device 20, an output circuit 10A, a sensor 10B, an input device 10C, a power control circuit 10G, and a power unit 10H.

The information processing device 20 generates a recommended route for the moving body 10 (as described later in detail). The information processing device 20 is a dedicated or a general computer, for example. In an example described in the present embodiment, the information processing device 20 is installed in the moving body 10.

The moving body 10 is a movable body. Examples of the moving body 10 include a vehicle (a motorcycle, an automobile, a bicycle), a cart, a robot, a vessel, and a flying object (such as an aircraft and a drone). For example, the moving body 10 includes: a moving body that is moved by a driving operation by human; and a moving body that can automatically move (autonomous traveling) without requiring the driving operation by human. Examples of the moving body that can automatically move include automatic driving cars. In an example described herein, the moving body 10 is a moving body capable of traveling autonomously.

The information processing device 20 is not limited to a mode of being installed in the moving body 10. The information processing device 20 may be installed in a still object including an unmovable object, and an object staying still with respect to the ground. Examples of the still object include a guardrail, a pole, a parked car, and a traffic sign. The information processing device 20 may be installed in a cloud server executing processing on a cloud.

The power unit 10H is a driving device installed in the moving body 10. Examples of the power unit 10H include an engine, a motor, and a wheel.

The power control circuit 10G controls the power unit 10H. The power unit 10H is driven under control performed by the power control circuit 10G. The power control circuit 10G controls the power unit 10H of the moving body 10 in such a manner that the moving body 10 moves in accordance with the recommended route generated by the information processing device 20, for example.

The output circuit 10A outputs various types of information. In the present embodiment, the output circuit 10A outputs output information indicating the recommended route.

The output circuit 10A has: a communication function for transmitting the output information; a display function for displaying the output information; and a sound output function for outputting sounds representing the output information, for example. The output circuit 10A includes a communication circuit 10D, a display 10E, and a speaker 10F, for example.

The communication circuit 10D transmits the output information to other devices. The communication circuit 10D transmits the output information through a known communication line, for example. The display 10E displays the output information. The display 10E is a known device such as a liquid crystal display (LCD), a projector, and a lamp, for example. The speaker 10E outputs sounds representing the output information.

The input device 10C receives various types of instructions and information input from a user. Examples of the input device 10C include: a pointing device such as a mouse or a trackball; and a keyboard. The input device 10C may have an input function on a touch panel integrally formed with the display 10E.

The sensor 100 is a sensor for acquiring a traveling environment of the moving body 10. Examples of the traveling environment include: monitored information on the moving body 10; and surrounding information around the moving body 10. Examples of the sensor 100 include an external sensor and an internal sensor.

The internal sensor is a sensor for monitoring the monitored information at least including the acceleration of the moving body 10. More specifically, the monitored information includes at least one of the acceleration of the moving body 10, a speed of the moving body 10, and an angular velocity of the moving body 10.

Examples of the internal sensor include an inertial measurement unit (IMU), an acceleration sensor, a speed sensor, and a rotary encoder. The IMU monitors the monitored information including three-dimensional acceleration and a three-dimensional angular velocity of the moving body 10.

The external sensor monitors the surrounding information around the moving body 10. The external sensor may be installed in the moving body 10, or may be installed outside of the moving body 10 (for example, another moving body or an external device).

The surrounding information indicates a surrounding condition of the moving body 10. The surroundings of the moving body 10 are an area within a predetermined range around the moving body 10. The range is a monitorable range of the external sensor, and may be set in advance.

The surrounding information is at least one of a captured image of the surroundings of the moving body 10 and distance information on the moving body 10, for example. The surrounding information may also include position information on the moving body 10. The captured image is captured image data (hereinafter, simply referred to as a captured image in some cases) obtained by image capturing. The distance information is information indicating a distance between the moving body 10 and a target, outside the moving body 10, which is monitorable by the external sensor. The position information may indicate a relative position and may also be an absolute position.

Examples of the external sensor include: an image capturing device that acquires a captured image by image capturing; a distance sensor (a millimeter wave radar, a laser sensor, or a distance image sensor); and a position sensor (a global navigation satellite system (GNSS), a global positioning system (GPS), and a wireless communication device).

The captured image includes: digital image data with a pixel value defined for each pixel; and a depth map with a distance from the sensor 10E defined for each pixel. Examples of the laser sensor include a two-dimensional laser imaging detection and ranging (LIDAR) sensor and a three-dimensional LIDAR sensor disposed in parallel with the horizontal plane.

Figure 2:
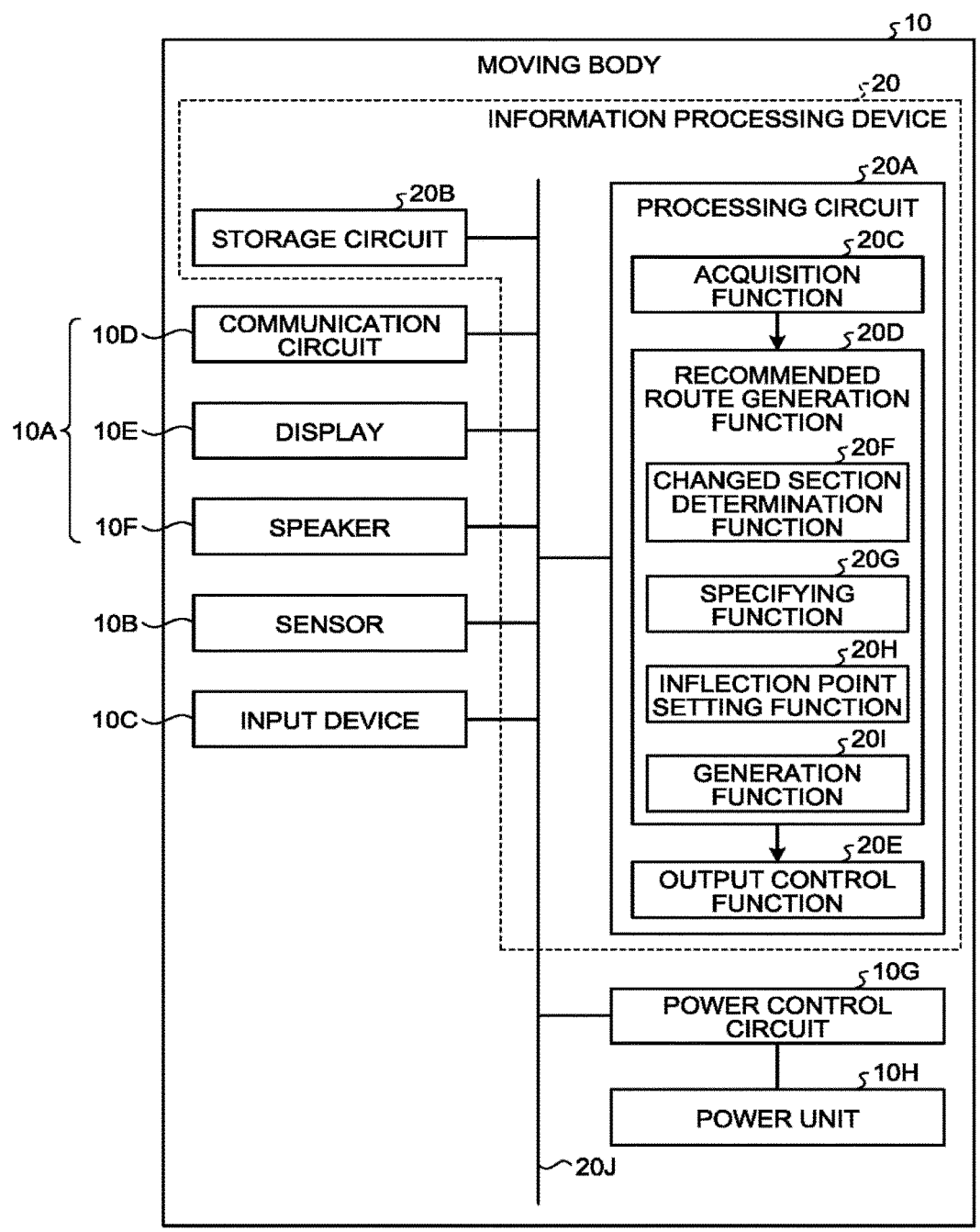
FIG. 2 is a block diagram illustrating a configuration of the moving body.

Next, an electrical configuration of the moving body 10 will be described in detail. FIG. 2 is a block diagram illustrating an example of the configuration of the moving body 10.

The moving body 10 includes the information processing device 20, the output circuit 10A, the sensor 10E, the input device 10C, the power control circuit 10G, and the power unit 10H. As described above, the output circuit 10A includes the communication circuit 10D, the display 10E, and the speaker 10F.

The information processing device 20, the output circuit 10A, the sensor 10B, the input device 10C, and the power control circuit 10G are connected to one another via a bus 20J. The power unit 10H is connected to the power control circuit 10G.

The information processing device 20 includes a storage circuit 20B and a processing circuit 20A. The output circuit 10A, the sensor 103, the input device 10C, the power control circuit 10G, and the storage circuit 20B are connected to the processing circuit 20A via the bus 20J.

At least one of the storage circuit 20B, the output circuit 10A (the communication circuit 10D, the display 10E, and the speaker 10F), the sensor 10B, the input device 10C, and the power control circuit 10G may be in wired or wireless connection with the processing circuit 20A. The processing circuit 20A may be connected with at least one of the storage circuit 20B, the output circuit 10A (the communication circuit 10D, the display 10E, and the speaker 10F), the sensor 10B, the input device 10C, and the power control circuit 10G, via a network.

The storage circuit 20E stores various types of data. Examples of the storage circuit 20B include a random-access memory (RAM), a semiconductor memory element such as a flash memory, a hard disk, and an optical disk. The storage circuit 20B may be a storage device provided outside of the information processing device 20. The storage circuit 20B may be a storage medium. More specifically, the storage medium may be a storage medium that a computer program and various types of information are downloaded through a local area network (LAN) and the Internet and stored or temporarily stored. The storage circuit 20B may include a plurality of storage media.

The processing circuit 20A has an acquisition function 20C, a recommended route generation function 20D, and an output control function 20E. The recommended route generation function 20D includes a changed section determination function 20F, a specifying function 20G, an inflection point setting function 20H, and a generation function 20I.

Each of the processing functions of the processing circuit is stored in the rage circuit 20B in a form of a computer-executable program. The processing circuit 20A is a processor that reads the program from the storage circuit 20B and executes the program to implement a function corresponding to the program.

The processing circuit 20A in a state of having read the program has the function in the processing circuit 20A illustrated in FIG. 2. In the description based on FIG. 2, the processing circuit 20A as a single unit implements the acquisition function 20C, the recommended route generation function 20D (the changed section determination function 20F, the specifying function 20G, the inflection point setting function 20H, and the generation function 20I), and the output control function 20E.

Alternatively, the processing circuit 20A may be configured by combining a plurality of independent processors each implementing the corresponding one of the functions. In this configuration, each function is implemented by the corresponding processor executing the program. Each processing function nay be provided as a computer program, and a single processing circuit may execute each program. Furthermore, a specific function may be mounted in a dedicated independent program execution circuit.

For example, the term "processor" in the present and other embodiments described later refers to a circuit of a central processing unit (CPU), a graphical processing unit (GPU), an application specific integrated circuit (ASIC), and a programmable logical device (examples of which include a simple programmable logic device (SPLD), a complex programmable logic device (CPLD), and a field programmable gate array (FPGA)).

The processor reads out a computer program stored in the storage circuit 20B and executes the program to implement a function. The program may be directly embedded in the circuit of the processor instead of being stored in the storage circuit 20B. In such a configuration, the processor reads out and executes the program embedded in the circuit to implement the function.

The acquisition function 20C acquires a scheduled traveling route that is scheduled to be a route from one location to another location traveled by the moving body 10. The scheduled traveling route is a route, between a current location to a destination, scheduled to be traveled by the moving body 10, for example.

More specifically, the scheduled traveling route includes: a line along a road between one location (for example, the current location of the moving body 10) and another location (for example, the destination) traveled by the moving body 10; and a line connecting lines on different roads. The line on the road is a line at the center of the road to be traveled (the center of a lane along the traveling direction), for example. The line connecting the lines on different roads is a line of an arch form with a constant radius of curvature, connecting an end portion of the line on one of the roads with an end portion of the line on the other one of the roads, for example.

The scheduled traveling route may further include: specifying information (hereinafter, also referred to as a road ID in some cases) of a road in the route; and speed information indicating recommended speed of the moving body 10.

The acquisition function 20C uses the communication circuit 10D to acquire the scheduled traveling route from the external device. The acquisition function 20C may also acquire he scheduled traveling route from the storage circuit 20B. The acquisition function 20C may generate the scheduled traveling route by using information acquired from at least one of the communication circuit 10D, the sensor 10B, the input device 10C, and the storage circuit 20B.

The acquisition function 20C that generates the scheduled traveling route acquires the current position information on the moving body 10 from the sensor 10B (for example, the GPS), for example. The acquisition function 20C acquires map data including the current position of the moving body 10. The acquisition function 20C acquires the map data from the external device via the storage circuit 20B and the communication circuit 10D, for example.

The acquisition function 20C receives position information on the destination from the input device 10C. For example, a user inputs a desired destination while viewing a map displayed on the display 10E. The input device 10C outputs the position information on the destination thus received, to the processing circuit 20A. Thus, the acquisition function 20C receives the position information on the destination.

The acquisition function 20C uses a known method to generate the scheduled traveling route connecting the current position (current location) of the moving body 10 with the received destination, on the map corresponding to the acquired map data. The acquisition function 20C calculates the line at the center of a lane in the road to be traveled (the center of the lane in the traveling direction), for example. When the road includes a plurality of lanes, the acquisition function 20C may calculate the line at the center of the lane to be traveled by the moving body 10 traveling in the traveling direction to the destination.

In a section involving change from one road to the other for passing through an intersection and the like, the acquisition function 20C may connect the line along the center of the lane in one road with a line along the center of a lane in the other road, with an arch line. The arch line may have a radius of curvature corresponding to that in a road marking (an arrow indicating a left or a right turn direction) drawn on the road in the section, for example.

The acquisition function 20C may calculate, as the scheduled traveling route, a route from the current location of the moving body 10 to the destination, obtained by connecting the calculated lines.

The acquisition function 20C may calculate the scheduled traveling route further including the speed information indicating the recommended speed of the moving body 10 in the following manner. The acquisition function 20C calculates the recommended speed at each location along the scheduled traveling route, based on the shape of the road and the road marking, acquired from the external sensor in the sensor 10B, for example. The acquisition function 20C uses the external sensor in the sensor 10B to measure the speed in the surroundings of the moving body 10, and calculates the measured speed as the recommended speed of the current position. The acquisition function 20C may associate the speed information indicating the recommended speed with each location along the scheduled traveling route.

Figure 3:
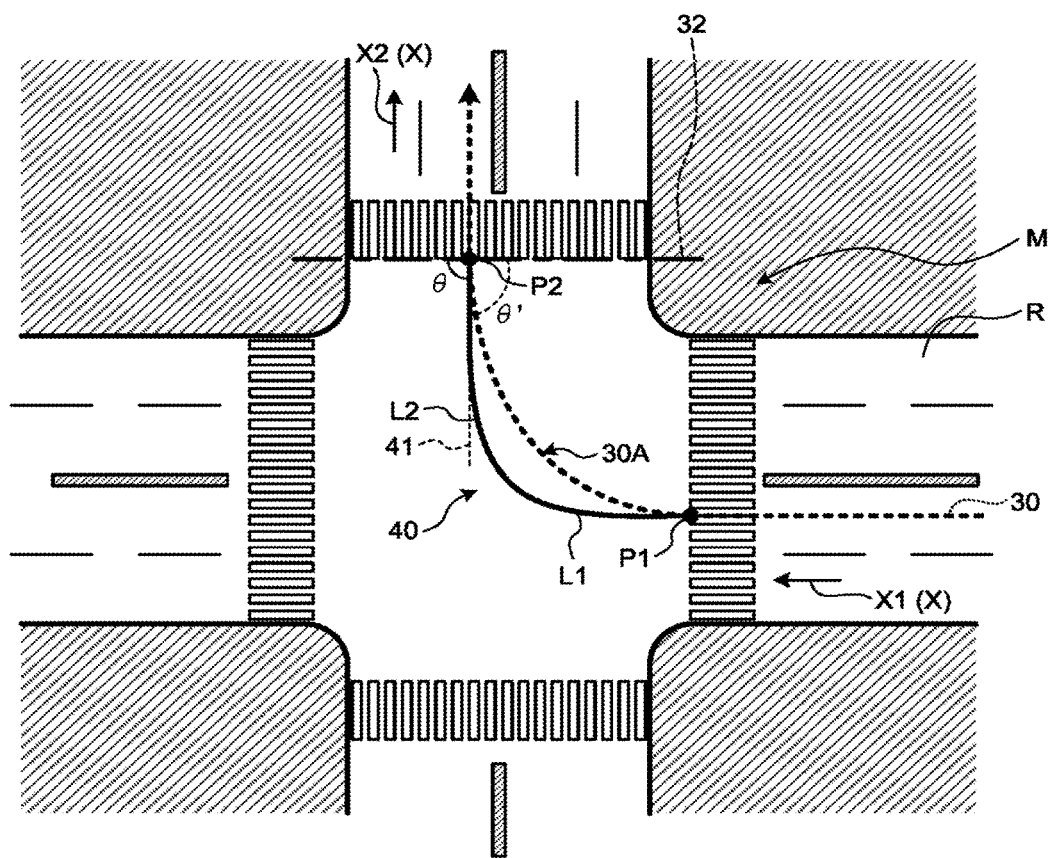
FIG. 3 is a diagram illustrating a recommended route.

The recommended route generation function 20D is one example of a recommended route generation unit. The recommended route generation function 20D generates the recommended route. FIG. 3 is a diagram illustrating a recommended route 40.

The recommended route generation function 20D generates the recommended route 40 with a changed section 30A, on a scheduled traveling route 30, including a first line L1 and a second line L2.

FIG. 3 is a diagram illustrating an example of how the recommended route 40 is generated. The changed section 30A is a section involving a change in a traveling direction within a predetermined range on the scheduled traveling route 30. The changed section 30A is a section on the scheduled traveling route 30, including at least one of a right-turn curve, a left-turn curve, and a curve within a predetermined radius of curvature, for example. Thus, the changed section 30A is a section on the scheduled traveling route 30, in which the moving body 10, traveling along the scheduled traveling route 30, makes a right-turn curve, a left-turn curve, or a curve within the predetermined radius of curvature. FIG. 3 illustrates an example where the moving body 10, traveling along the scheduled traveling route 30, makes a right turn in the changed section 30A.

The predetermined radius of curvature in the changed section 30A may be set in advance. The predetermined radius of curvature in the changed section 30A may be changeable by an input by the user to the input device 10C. The predetermined radius of curvature in the changed section 30A is preferably in a range between 1.5 m inclusive and 100 m inclusive, and is particularly preferably in a range between 5 m inclusive and 20 m inclusive.

The changed section 30A may be a section on the scheduled raveling route 30, along the traveling direction, starting from a position before a starting position where a curve starts (a position where the straight line turns into an arch) to a position after an end position where the curve ends (a position where the arch turns into a straight line).

The first line L1 continues to a first position P1 at the entrance of the changed section 30A. The second line L2 continues to a second position P2 at the exit of the changed section 30A. The first line L1 has an end portion on the opposite side of the first position P1 in the first line L1 connected to an end portion of the second line L2 on the opposite side of the second position P2 in the second line L2. The second line L2 is longer than the first line L1. An angle θ between a tangential line 41 of the second line L2 and an exit line 32 of the changed section 30A is within a predetermined angle range.

As described above, the first position P1 is at the entrance of the changed section 30A. In other words, the first position P1 corresponds to an end portion on an upstream side of a traveling direction X of the moving body 10 in the changed section 30A.

As described above, the second position P2 is at the exit of the changed section 30A. In other words, the second position P2 corresponds to an end portion on a downstream side of the traveling direction X of the moving body 10 in the changed section 30A.

The exit line 32 is a straight line that passes through the second position P2 and is orthogonal to a traveling direction X2 after exiting the changed section 30A on the scheduled traveling route 30.

Figure 4:
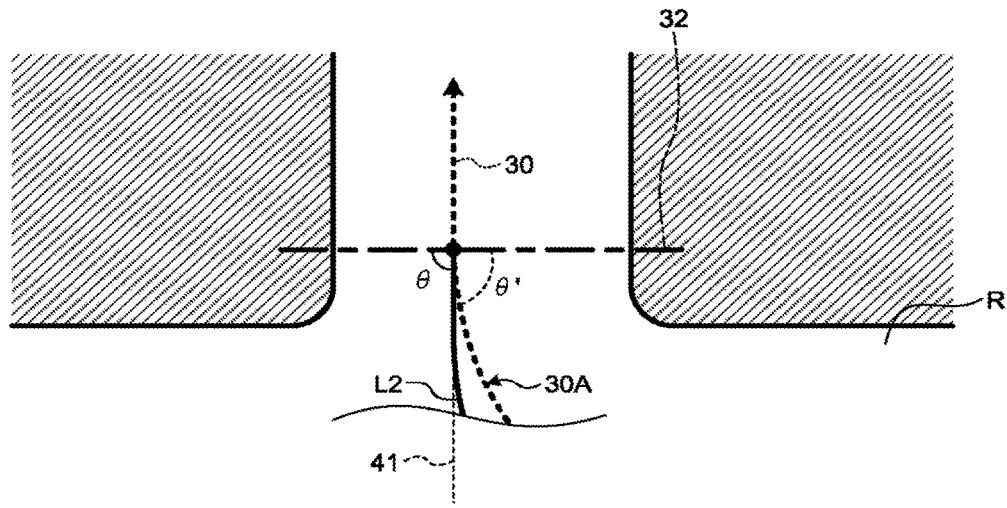
FIG. 4 is a diagram illustrating an angle between a tangential line of a second line and an exit line.

The angle θ between the tangential line 41 of the second line L2 and the exit line 32 is within the predetermined angle range. FIG. 4 illustrates the angle θ between the tangential line 41 of the second line 12 and the exit line 32

The angle θ between the tangential line 41 of the second line L2 and the exit line 32 may be any angle within the predetermined angle range at least including 90°. More specifically, the predetermined angle range including the angle θ is 90°±10°, 90°±5°, or the like. In an intersection where roads orthogonally cross each other, the predetermined angle range including the angle θ is a range between an angle θ', between the changed section 30A and the exit line 32, inclusive and 90° inclusive.

Referring back to FIG. 3, the second line L2 preferably has a larger radius of curvature than the changed section 30A.

The first line L1 and the second line L2 each preferably have a larger radius of curvature than the changed section 30A. The first line L1 and the second line L2 each has a radius of curvature that is larger than that of the changed section 30A by a factor of 1.5, 2, or more, for example.

The radius of curvature may be the same or different between the first line L1 and the second line L2. The second line L2 preferably has a larger radius of curvature than the first line L1, for example. More specifically, the second line L2 is larger than that of the first line L1 by a factor of 1.5, 2, 2.5, 3, 3.5, or the like.

The recommended route generation function 20D generates the recommended route 40 with the changed section 30A, on the scheduled traveling route 30, including the first line L1 and the second line L2.

The recommended route generation function 20D generates the recommended route 40 by generating the first line L1 and the second line L2, having the characteristics described above, for the changed section 30A on the scheduled traveling route 30. How the recommended route generation function 20D generates the first line L1 and the second line L2 is not particularly limited, as long as the first line L1 and the second line L2 having the characteristics are obtained.

In the description of the present embodiment, the recommended route generation function 20D generates the recommended route 40 by using an inflection point, as will be described below in detail.

In the present embodiment, the recommended route generation function 20D includes the changed section determination function 20E, the specifying function 20G, the inflection point setting function 20H, and the generation function 20I.

The changed section determination function 20F is an example of a changed section determination unit. The changed section determination function 20F determines whether the scheduled traveling route 30, acquired by the acquisition function 20C, includes the changed section 30A.

The changed section determination function 20F determines whether the changed section 30A is included, by determining whether the scheduled traveling route 30 includes at least one of a right-turn curve, a left-turn curve, and curve within a predetermined radius of curvature. The changed section determination function 20E specifies the changed section 30A on the scheduled traveling route 30.

The changed section determination function 20F specifies, as the changed section 30A, a section, on the scheduled traveling route 30, including a curve with the predetermined radius of curvature described above or less, for example.

The changed section determination function 20F specifies, as the changed section 30A, a section, on the scheduled traveling route 30, including a right-turn curve or a left-turn curve in an intersection. More specifically, the changed section determination function 20F specifies, as the changed section 30A, a section of a line connecting different roads adjacent to each other along the traveling direction on the scheduled traveling route 30. The section between different roads adjacent to each other along the traveling direction on the scheduled traveling route 30 may be specified by determining areas with different road IDs that are adjacent to each other in the traveling direction on the scheduled traveling route 30.

The changed section determination function 20F may also specifies the changed section 30A by determining whether a section includes an intersection, based on a traffic sign in the surroundings of the moving body 10 or a traffic sign acquired from the map data.

Figure 5:
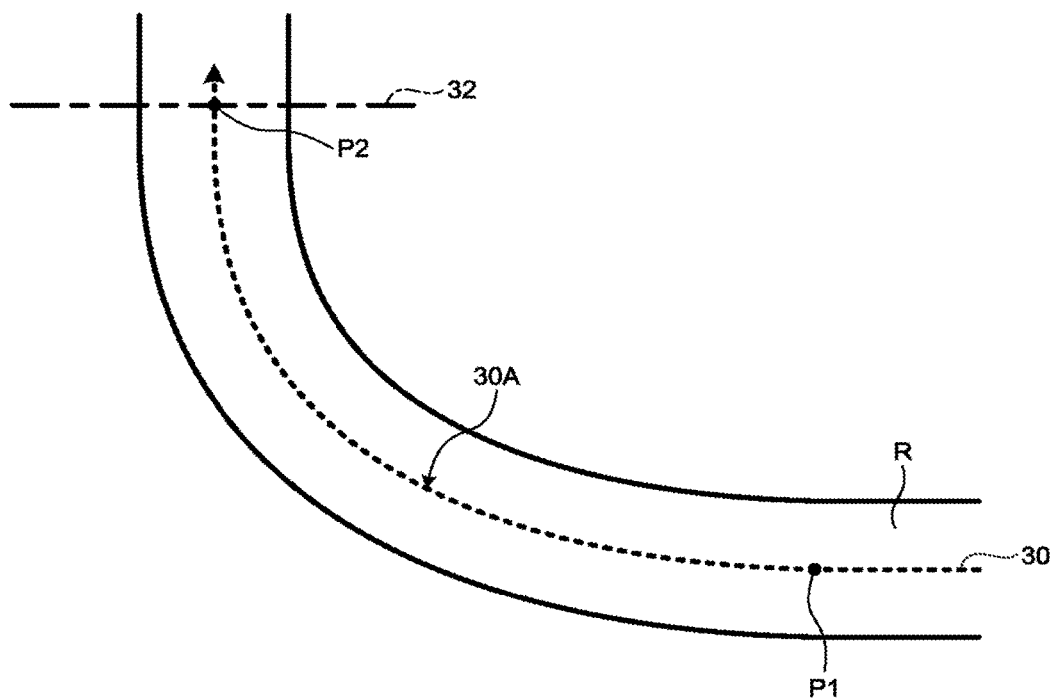
FIG. 5 is a schematic diagram illustrating a changed section.

As described above, the changed section determination function 20F specifies as the changed section 30A, a section, on the scheduled traveling route 30, including a section with an intersection to be turned right or left or a section with a curve within a predetermined radius of curvature (see FIG. 5).

The changed section determination function 20F may not specify a section that has a curve within the predetermined radius as the changed section 30A, and corresponds to a lane, traveled by the moving body 10, with a width not exceeding a threshold. The threshold is a value that is larger than the width of the moving body 10 by a factor of less than 2 or 1.5 or less, for example. This is because the scheduled traveling route 30 is difficult to change in a lane with such a width.

Referring back to FIG. 2, the changed section determination function 20F may determine and specify the changed section 30A included in the scheduled traveling route 30 before the moving body 10 starts traveling along the scheduled traveling route 30.

The changed section determination function 20F may determine and specify whether the changed section 30A is present on the front side of the moving body 10 in the traveling direction, while the moving body 10 is traveling along the scheduled traveling route 30. While the moving body 10 is traveling, the recommended route generation function 20D may generate the recommended route 40, when the changed section determination function 20F determines that the changed section 30A is present.

In an example described in the present embodiment, the recommended route generation function 20D executes processing of generating the recommended route 40, while the moving body 10 is traveling.

The specifying function 20G specifies the exit line 32, the first position P1, and the second position P2, for the changed section 30A specified by the changed section determination function 20F.

As illustrated in FIG. 3, the specifying function 20G specifies the first position P1 in the changed section 30A. The specifying function 20G specifies the first position P1 on the scheduled traveling route 30. The specifying function 20G specifies the end portion of the changed section 30A, specified by the changed section determination function 20F, on the upstream side in the traveling direction X, as the first position P1. The specifying function 20G may specify, as the first position P1, a position where the curvature starts upon entering the changed section 30A from a position before the changed section 30A (on the upstream side in the traveling direction X) on the scheduled traveling route 30. The specifying function 20G may specify the first position P1 at a position before the changed section 30A (on the upstream side in the traveling direction X) on a straight line along an entrance direction (a direction indicated by an arrow X1) toward the changed section 30A on the scheduled traveling route 30.

The specifying function 20G specifies the second position P2 in the changed section 30A. The specifying function 20G specifies the second position P2 on the scheduled traveling route 30. The specifying function 20G specifies the end portion of the changed section 30A, specified by the changed section determination function 20F, on the downstream side in the traveling direction X, as the second position P2. The specifying function 20G may specify the second position P2 at a position after the changed section 30A (on the downstream side in the traveling direction X) on a straight line along the traveling direction X2 after exiting the changed section 30A.

The specifying function 20G specifies the exit line 32. The specifying function 20G specifies a straight line, on the scheduled traveling route 30, passing through the second position P2 and being orthogonal to the traveling direction X2 after exiting the changed section 30A, as the exit line 32.

It is to be noted that the first position P1, the second position P2, and the exit line 32 are merely virtual positions and line, and thus do not exist in a real space.

The specifying function 20G may specify as the exit line 32, a straight line, on a surface of a road R, along a traffic sign indicating a stop line or a walking direction indicated by a cross-walk at and around a position of the exit of the changed section 30A.

Referring back to FIG. 2, the inflection point setting function 20H is an example of an inflection point setting unit. The inflection point setting function 20H sets an inflection point in a setting area corresponding to the changed section 30A. In the present embodiment, the inflection point setting function 20H sets a single inflection point in the setting area.

Figure 6:
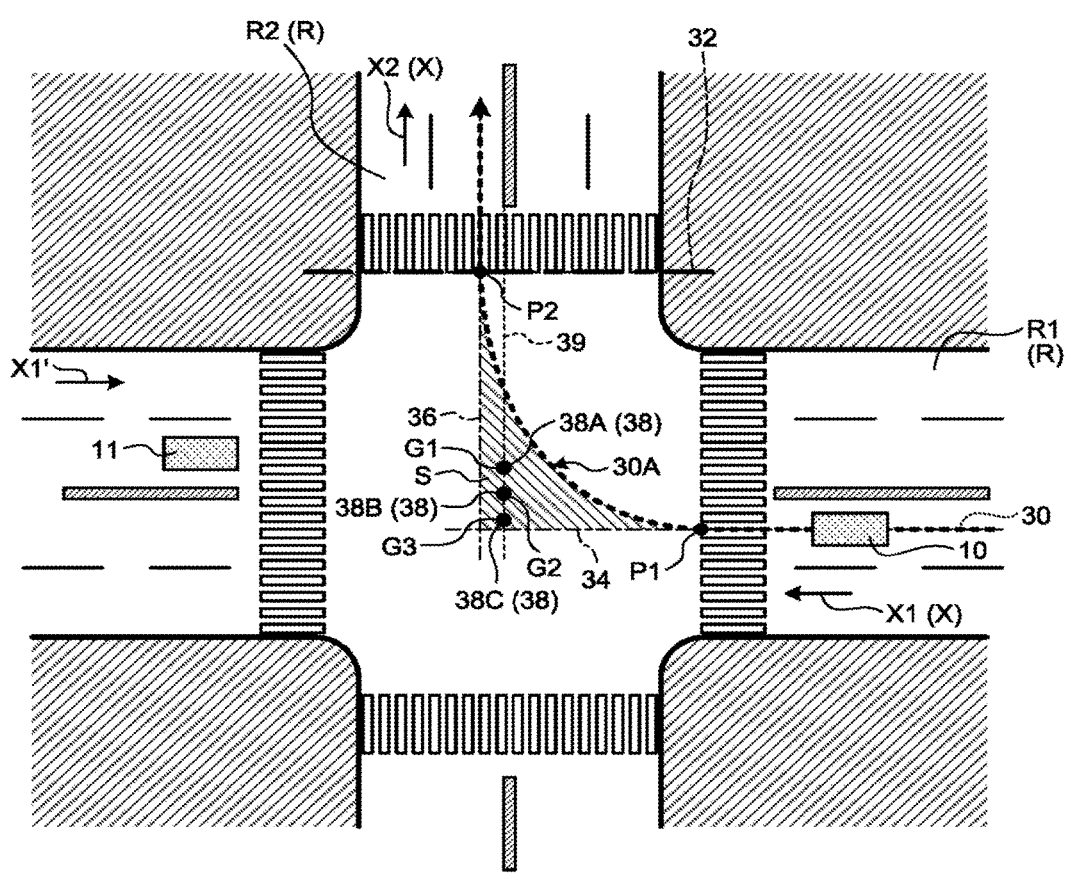
FIG. 6 is a diagram illustrating how an inflection point is set.

FIG. 6 is a diagram illustrating an example of how an inflection point 38 is set. The inflection point setting function 20H sets a single inflection point 38 (for example, an inflection point 38A) in a setting area S.

The setting area S is an area defined by: a line 34 that passes through the first position P1 and extends along the entrance direction (the direction indicated by the arrow X1) toward the changed section 30A; a line 36 that passes through the second position 92 and extends along the traveling direction (a direction indicated by an arrow X2) after exiting the changed section 30A; and the changed section 30A in an arch form. The line 34 and the line 36 are preferably straight lines.

The inflection point setting function 20H sets a single inflection point 38 (for example, the inflection point 36A) in a setting area S.

In the present embodiment, the inflection point setting function 209 sets the inflection point 38 on a center line 39 in the setting area The center line 39 a center line of the road R2 to be traveled after exiting the changed section 30A. In other words, the center line 39 is a straight line that passes through the center of the road in a road width, and extends along the traveling direction on the road R2. More specifically, the center line 39 is a straight line extending along a right-side edge with respect to the traveling direction in the lane to be traveled on the road R2 to be traveled after exiting the changed section 30A. It is assumed that the moving body 10 may be scheduled to travel on a left lane of the road R2, with two lanes on one side, to be traveled after exiting the changed section 30A as illustrated in FIG. 6, for example. In such a case, the inflection point setting function 20H may set as the center line 39, a straight line extending along the right-side edge, with respect to the traveling direction, in the road width direction of the lane (that is, a line along the boundary between two lanes on one side).

Preferably, the inflection point setting function 20H preferably sets the inflection point 38 at a position more separated from the exit line 32 in the setting area S in a case where a radius of curvature of the changed section 30A in an arch form does not exceed a threshold, compared with a case where the radius of curvature of the changed section 30A exceeds the threshold. Preferably, the inflection point setting function 20H sets the inflection point 38 at a position more separated from the exit line 32 in the setting area S, for the changed section 30A in an arch form with a smaller radius of curvature not exceeding the threshold.

The inflection point setting function 20H sets the inflection point 38A at a position G1 in the setting area S, when the radius of curvature of the changed section 30A with an arch shape exceeds the threshold, for example. The inflection point setting function 20H sets an inflection point 38B at a position G2 in the setting area S, when the radius of curvature of the changed section 30A with an arch shape does not exceed the threshold. The position G2 is positioned farther from the exit line 32 than the position G1. The inflection point setting function 20H sets an inflection point 38C at a position G3 when the radius of curvature of the changed section 30A with an arch form is smaller than the radius of curvature of the changed section 30A used for setting the position G2. The position G3 is positioned farther from the exit line 32 than the position G2.

In this manner, the inflection point setting function 20H sets the inflection point 38 at a position farther from the exit line 32 in the setting area S, for a smaller radius of curvature of the changed section 30A with an arch form (that is, for a larger curvature or for a sharper curve).

The inflection point setting function 20H may adjust the position of the inflection point 38 in the setting area S, in accordance with whether an oncoming vehicle 11 exists.

The inflection point setting function 20H determines whether the oncoming vehicle 11, as another moving body, exists in a direction extending in the entrance direction (the direction indicated by the arrow X1) from the first position P1 toward the changed section 30A, for example. More specifically, the inflection point setting function 20H determines whether there is the oncoming vehicle 11 as the other moving body moving in a direction (direction indicated by an arrow X1') opposite to the entering direction (the direction indicated by the arrow X1) from the first position P1 toward the changed section 30A, and approaching the changed section 30A.

The inflection point setting function 20H sets the inflection point 38 at the position farther than the exit line 32 in the setting area S when the oncoming vehicle 11 exists, compared with a case with no oncoming vehicle 11.

More specifically, the inflection point setting function 20H sets the inflection point 38A at the position G1 in the setting area S, in the case with no oncoming vehicle 11. When the oncoming vehicle 11 exists, the inflection point setting function 20H sets the inflection point 38 at the position G2 or the position G3 (see inflection point 382 and the inflection point 38C), in the setting area S, that are more separated from the exit line 32 than the position G1.

It is to be noted that when the oncoming vehicle 11 exists, the inflection point 38 may be set at any position involving no collision with the oncoming vehicle 11 traveling in the opposite direction (indicated by the arrow X1'). More specifically, the position of the inflection point 38 set when in the case with no oncoming vehicle 11 is preferably separated from the position of the inflection point 38 set when the oncoming vehicle 11 exists, by a distance corresponding to the width of a single lane (for example, 3.5 m) or more.

As described above, the inflection point setting function 20H sets the inflection point 38 at a position separated from the exit line 32 in the setting area S, when the oncoming vehicle 11 exists.

Referring back to FIG. 2, the generation function 20I is one example of a generation unit. The generation function 20I generates the recommended route 40 including the first line L1 and the second line L2 by generating a line connecting the first position P1 with the inflection point 38 and a line connecting the inflection point 38 with the second position 82. The line connecting the first position P1 with the inflection point 38 and the line connecting the inflection point 38 with the second position are each preferably a curve smoothly connecting between the points. The line connecting the first position P1 with the inflection point 38 and the line connecting the inflection point 38 with the second position P2 are each an arch line so that the moving body 10 can travel smoothly along the generated lines for the sake of taking into consideration of drivability of the moving body 10.

Figure 7:
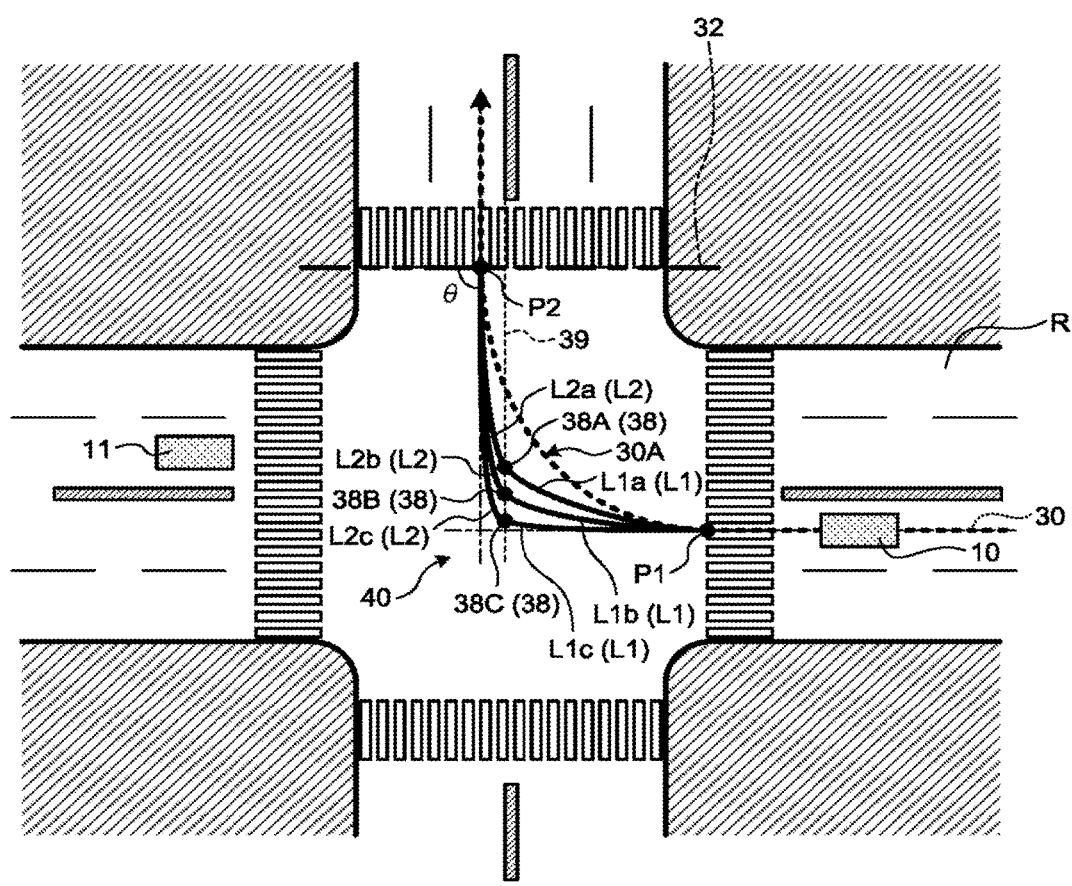
FIG. 7 is a diagram illustrating a recommended route.

FIG. 7 is a diagram illustrating the recommended route 40. It is assumed that the inflection point setting function 20H may set the inflection point 38A in the setting area S, for example. In such a case, the generation function 20I generates a line L1a a connecting the first position P1 with the inflection point 38A and a line L2a connecting the inflection point 38A with the second position P2. Thus, the generation function 20I generates the recommended route 40 with the changed section 30A including the first line L1 and the second line L2.

It is assumed that the inflection point setting function 20H may set the inflection point 38B in the setting area S, for example. In such a case, the generation function 20I generates a line L1b connecting the first position P1 with the inflection point 38B and a line L2b connecting the inflection point 38B with the second position P2. Thus, the generation function 20I generates the recommended route 40 with the changed section 30A including the first line L1 and the second line L2.

It is assumed that the inflection point setting function 20H may set the inflection point 38C in the setting area S, for example. In such a case, the generation function 20I generates a line L1c connecting the first position P1 with the inflection point 36C and a line L2c connecting the inflection point 38C with the second position P2. Thus, the generation function 20I generates the recommended route 40 with the changed section 30A including the first line L1 and the second line L2.

FIG. 7 illustrates a case where the first line L1 is the line (L1a, L1b, L1c) connecting the first position P1 with the inflection point 38 and the second line L2 is the line (L2a, L2b, L2c) connecting the inflection point 38 with the second position P2. However, the point connecting the first line L1 with the second line L2 is not limited to a point that matches the inflection point 38.

More specifically, the point connecting the first line L1 with the second line L2 may not match the inflection point 38. In other words, the generation function 20I may generate the recommended route 40 including a line extending from the first position P1 to the second position P2 via the inflection point 38 including the first line L1 and the second line L2 having the above described characteristics. Thus, the first position P1, the inflection point 38, the connecting point between the first line L1 and the second line L2, and the second position P2 are all on the recommended route 40.

The recommended route generation function 20D generates the recommended route 40 in the manner described above. As described above, the recommended route 40 has the changed section 30A, as a section on the scheduled traveling route 30 involving a change in the traveling direction within the predetermined range, including the first line L1 and the second line L2. The first line L1 continues to the first position P1 at the entrance of the changed section 30A. The second line L2 continues to the second position P2 at the exit of the changed section 30A, and is longer than the first line L1. The angle θ between the tangential line 41 of the second line L2 and the exit line 32 is within the predetermined angle range.

Thus, the moving body 10 traveling along the recommended route 40 can travel in the changed section 30A, involving the change in the traveling direction within the predetermined range, to have the front face of the moving body 10 more quickly face the exit line 32.

More specifically, the second line L2 traveled to exit the changed section 30A is longer than the first line L1 traveled to enter the changed section 30A. Thus, longer traveling along the second line L2, entering the exit line 32 within a predetermined range, can be achieved before reaching the exit line 32. In other words, the moving body 10 can have the front face of the moving body 10 face the exit line 32 more quickly and for a longer period of time. This means that a line of sight of a driver of the moving body 10 can be directed towards the exit line 32 more quickly and for a longer period of time.

Next, the output control function 20E will be described. The output control function 20E is an example of an output control unit. The output control function 20E outputs the recommended route 40, generated by the recommended route generation function 20D, to the power control circuit 10G that controls the power unit 10H.

More specifically, the output control function 20E outputs the recommended route 40 to at least one of the power control circuit 10G and the output circuit 10A.

Figure 8:
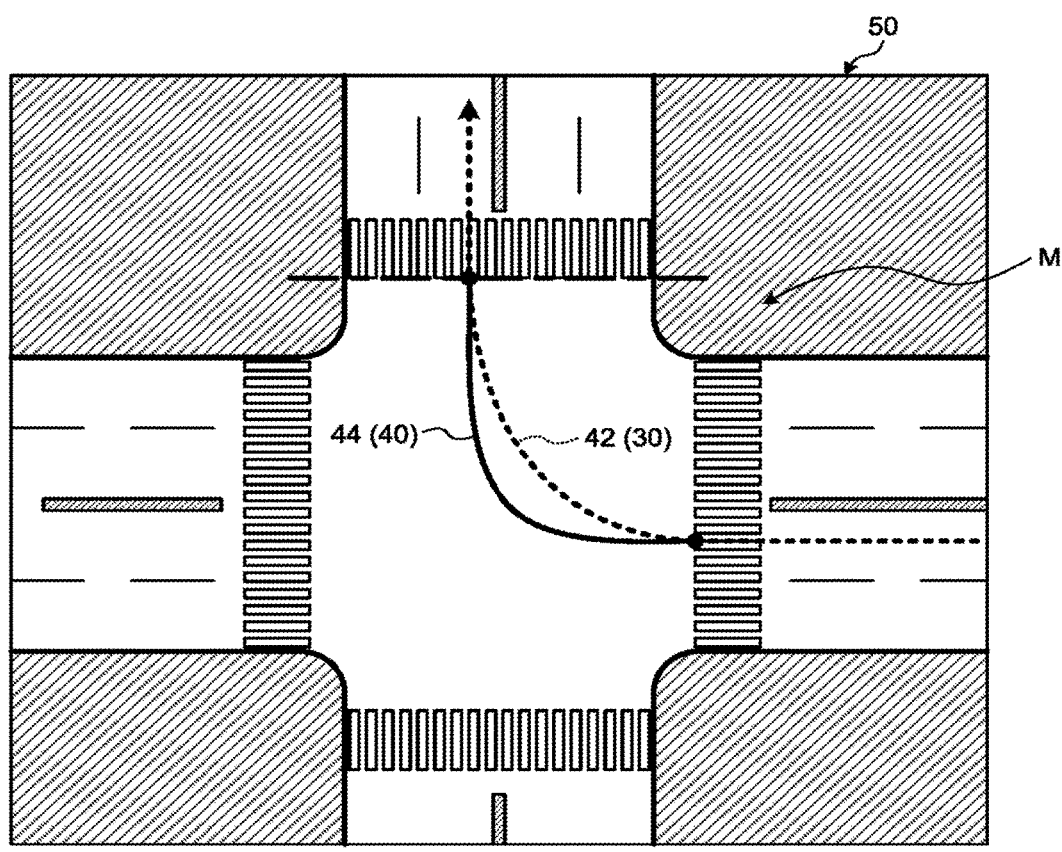
FIG. 8 is a schematic diagram illustrating an example of a display image.

First, a case where the output control function 20E outputs the recommended route 40 to the output circuit 10A is described. The output control function 20E displays output information including the recommended route 40 to the display 10E, for example. FIG. 8 is a schematic diagram illustrating an example of a display image 50. The output control function 20E displays the display image 50 on the display 10E, for example. The display image 50 presents a map M including a scheduled traveling route image 42 indicating the scheduled traveling route 30, and a recommended route image 44 indicating the recommended route 40.

Referring back to FIG. 2, the output control function 20E may control the speaker 10F in such a manner that the sound representing the recommended route 40 is output.

Next, a case where the output control function 20E outputs the recommended route 40 to the power control circuit 10G will be described. In this case, the power control circuit 10G controls the power unit 10H in accordance with the recommended route 40 received from the output control function 20E.

The power control circuit 10G uses the recommended route 40 to generate a power control signal for controlling the power unit 10H, and thus controls the power unit 10H, for example. The power control signal is a control signal for controlling a driving unit for performing driving related to the traveling of the moving body 10 in the power unit 10H. The power control signal includes a control signal for adjusting a steering angle and an acceleration amount.

More specifically, the power control circuit 10G acquires the current position, orientation, and speed of the moving body 10 from the sensor 10B.

The power control circuit 10G uses these pieces of information acquired from the sensor 10B and the recommended route 40 to generate the recommended traveling route actually used for traveling support, so that a deviation between the current position of the moving body 10 and the recommended route 40 becomes zero. The recommended traveling route may be generated with a known method. The recommended traveling route may include the recommended speed of the moving body 10 set by the power control circuit 10G. The power control circuit 10G then generates the power control signal, for traveling along the recommended traveling route, and outputs the power control signal to the power unit 10H.

In this manner, the power control circuit 10G controls the power unit 10H (the steering and the engine of the moving body 10) so that the traveling along the recommended traveling route can be achieved. Thus, the moving body 10 travels along the route corresponding to the recommended route 40.

The processing of generating the recommended traveling route based on the recommended route 40 and the processing of generating the power control signal may be at least partially executed on a side of the output control function 20E.

Figure 9:
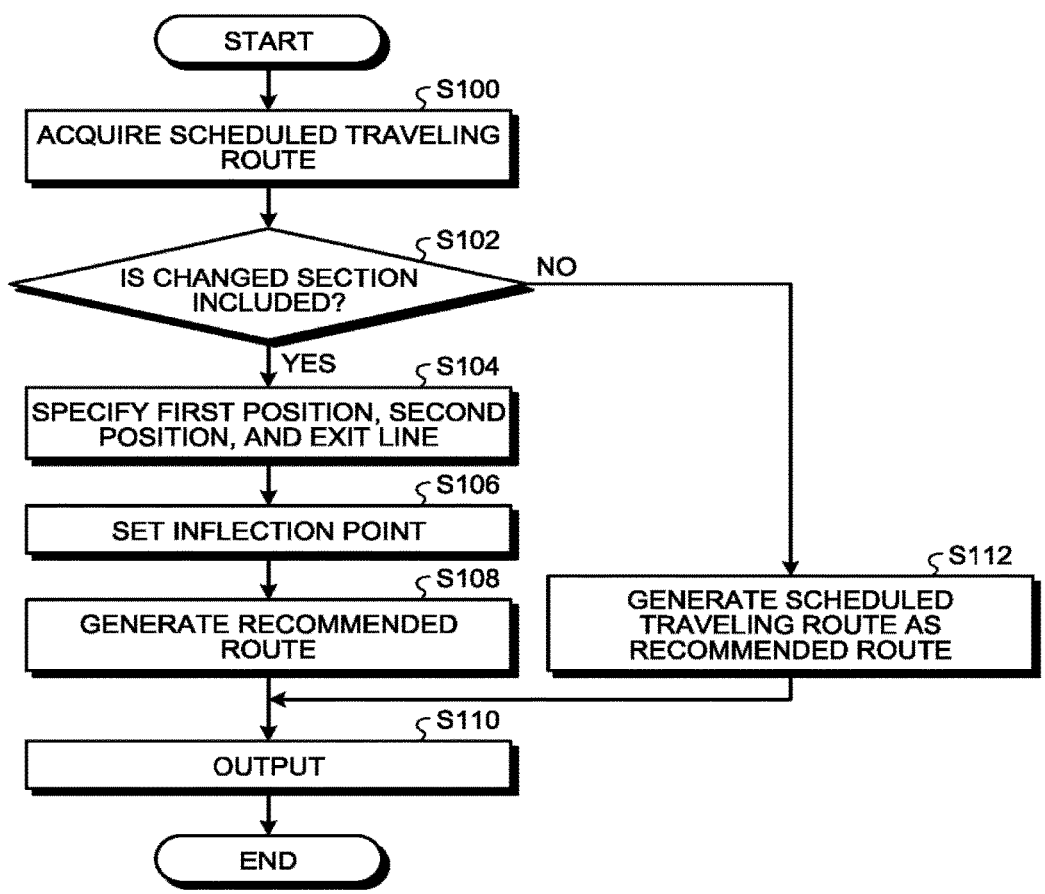
FIG. 9 is a flowchart illustrating a procedure of information processing.

Next, a procedure of information processing executed by the processing circuit 20A will be described. FIG. 9 is a flowchart illustrating the procedure of the information processing executed by the processing circuit 20A.

First of all, the acquisition function 20C acquires the scheduled traveling route 30 (step S100). The changed section determination function 20F then determines whether the scheduled traveling route 30, acquired at step S100, includes the changed section 30A (step S102). In this routine, the changed section determination function 20F determines whether the scheduled traveling route 30 includes the changed section 30A on the forward side in the traveling direction of the moving body 10.

If the result of the determination is positive at step S102 (Yes at step S102), the processing proceeds to step S104. At step S104, the specifying function 20G specifies the exit line 32, the first position P1, and the second position P2 for the changed section 30A determined (specified) at step S102 (step S104).

Next, the inflection point setting function 20H sets the inflection point 38 in the setting area S by using the exit line 32, the first position P1, and the second position P2 specified at step S104, for the changed section 30A specified at step S102 (step S106).

Next, the generation function 20I generates the recommended route 40 (step S108). At step S108, the generation function 20I generates a line connecting the first position P1 with the inflection point 38 and a line connecting the inflection point 38 with the second position P2, by using the first position P1, the second position P2, and the exit line 32 specified at step S104, and the inflection point 38 set at step S106. Thus, the generation function 20I generates the recommended route 40 with the changed section 30A, on the scheduled traveling route 30, including the first line L1 and the second line L2. The processing then proceeds to step S110.

If the result of the determination at step S102 described above is negative (No at step S102), the processing proceeds to step S112. At step S112, the recommended route 40 is generated as the scheduled traveling route 30 acquired at step S100 (step S112). Thus, when the scheduled traveling route 30 includes no changed section 30A, the recommended route generation function 20D directly uses the scheduled traveling route 30 as the recommended route 40. The processing then proceeds to step S110.

At step S110, the output control function 20E outputs the recommended route 40 generated at step S108 or 112 to at least one of the power control circuit 10G and the output circuit 10A (step S110). Thus, this routine is terminated.

As described above, the information processing device 20 according to the present embodiment has the recommended route generation function 20D. The recommended route generation function 20D generates the recommended route 40 with the changed section 30A, involving the change in the traveling direction within a predetermined range on the scheduled traveling route 30, including the first line L1 and the second line L2. The first line L1 continues to the first position P1 at the entrance of the changed section 30A. The second line L2 continues to the second position P2 at the exit of the changed section 30A. The second line L2 is longer than the first line L1. The angle θ between the tangential line 41 of the second line L2 and the exit line 32 is within the predetermined angle range.

Thus, the moving body 10 traveling in the recommended route 40 can have the front face of the moving body 10 quickly face the exit line 32 while traveling in the changed section 30A involving the change in the traveling direction within the predetermined range.

As described above, in the recommended route 40, the second line L2 on the side of the exit line 32 is longer than the first line L1 to be traveled when entering the changed section 30A. Thus, the moving body 10 can travel on the second line L2, for reaching the exit line 32 within the predetermined range, more quickly and for a longer period of time, in the changed section 30A. In other words, the moving body 10 can have the front face in the traveling direction face the exit line 32 more quickly and for a long period of time. This means that the line of sight of the driver of the moving body 10 can be directed toward the exit line 32 more quickly and for a longer period of time.

Consequently, the information processing device 20 according to the present embodiment can achieve higher traveling assist performance.

An area around the exit line 32 of the changed section 30A is likely to require a careful attention of the driver of the moving body 10. More specifically, the area around the exit line 32 of the changed section 30A is likely to include objects such as a pedestrian and a bicycle. In view of this, the driver on the moving body 10 traveling in the recommended route 40 can have the line of sight directed toward the exit line 32 (that is, the area requiring careful attention) more quickly and for a longer period of time.

The changed section 30A on the scheduled traveling route 30 is likely to be an arch line, with a constant radius of curvature, connecting the end portion of a line passing through one of the roads with an end portion of a line passing through the other one of the roads. Thus, for example, the moving body 10 traveling on a line with a constant radius of curvature, for turning left or right in the intersection, requires a long period of time before the front face of the moving body 10 faces the exit line 32 in the traveling direction. The information processing device 20 according to the present embodiment generates the recommended route 40 with the changed section 30A, involving the change in the traveling direction within the predetermined range on the scheduled traveling route 30, including the first line L1 and the second line L2.

Thus, for the moving body 10 traveling along the recommended route 40, a smooth path can be achieved, while having the line of sight of the driver of the moving body 10 face the exit line 32 (that is, the area requiring a careful attention) more quickly and for a longer period of time.

Thus, the information processing device 20 according to the present embodiment can achieve a higher traveling assist performance for the moving body 10.

When the radius of curvature of the changed section 30A in an arch form does not exceed the threshold, the information processing device 20 according to the present embodiment (the inflection point setting function 20H) sets the inflection point 38 at a position farther than the exit line 32 in the setting area S compared with a case where the radius of curvature of the changed section 30A exceeds the threshold. The information processing device 20 (inflection point setting function 20H) may set the inflection point 38 at a point farther from the exit line 32 in the setting area 3, for a smaller radius of curvature of the changed section 30A with an arch form that does not exceed the threshold.

Thus, the information processing device 20 according to the present embodiment can set the length of the second line L2 between the inflection point 38 and the second position to be longer than the length of the first line L1 between the first position P1 and the inflection point 38 by a longer distance for a smaller radius of curvature of the changed section 30A with an arch form (that is for a larger curvature or for a more steep curve).

The information processing device 20 (inflection point setting function 20H) according to the present embodiment may be configured to set no inflection point 38 when the radius of curvature of the changed section 30A in an arch form is equal to a certain reference value or smaller.

When the oncoming vehicle 11 is present in the entering direction (the direction indicated by the arrow X1) from the first position P1 toward the changed section 30A, the information processing device 20 (inflection point setting function 20H) according to the present embodiment sets the inflection point 38 at a position farther from the exit line 32 in the setting area S compared with a case with no oncoming vehicle 11.

Thus, when the oncoming vehicle 11 exists, the information processing device 20 according to the present embodiment can set the inflection point 38 at the position where the moving body 10 can wait for the oncoming vehicle 11 to pass.

Thus, the information processing device 20 according to the present embodiment can achieve higher traveling assist performance for the moving body 10.

The power control circuit 10G according to the present embodiment controls the power unit 10H of the moving body 10 in accordance with the recommended route 40 received from the output control function 20E. Thus, in the present embodiment, the power unit 10H can be controlled in such a manner that the moving body 10 autonomously travels along the recommended route 40.

Second Embodiment

In a second embodiment, the recommended route 40 is generated with a method different from that in the first embodiment.

Figure 10:
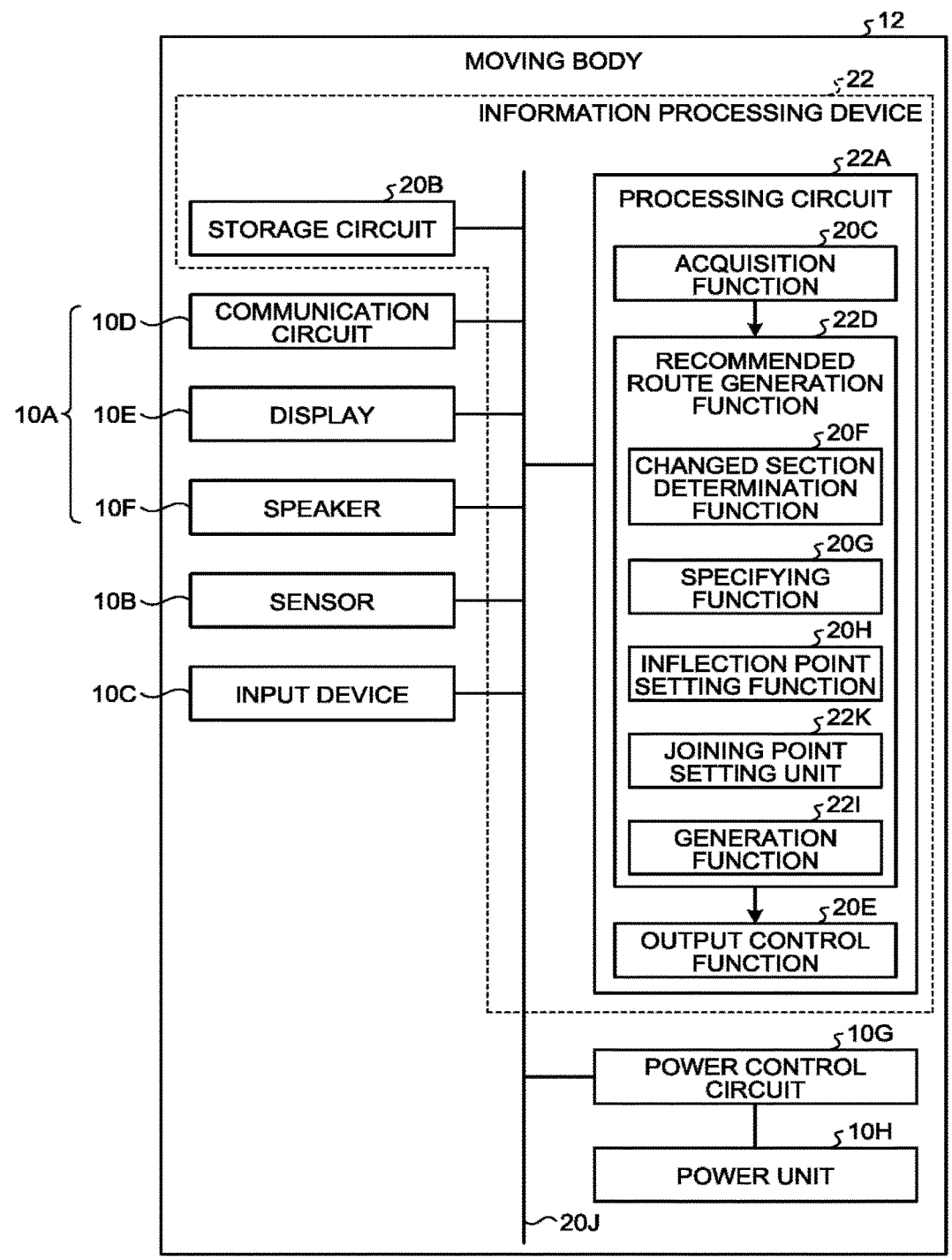
FIG. 10 is a block diagram illustrating a configuration of a moving body.

FIG. 10 is a block diagram illustrating an example of a moving body 12 according to the present embodiment.

The moving body 12 includes an information processing device 22, the output circuit 10A, the sensor 10B, the input device 10C, the power control circuit 10G, and the power unit 10H. The moving body 12 is the same as the moving body 10 according to the first embodiment, except in that the information processing device 22 is provided instead of the information processing device 20 (also see FIG. 1).

The information processing device 22 includes the storage circuit 20B and a processing circuit 22A. The information processing device 22 is the same as the information processing device 20 according to the first embodiment, except in that the processing circuit 22A is provided instead of the processing circuit 20A.

At least one of the storage circuit 20B, the output circuit 10A, the sensor 10B, the input device 10C, and the power control circuit 10G may be in wired or wireless connection with the processing circuit 22A. At least one of the storage circuit 20B, the output circuit 10A (the communication circuit 10D, the display 10E, and the speaker 10F), the sensor 10B, the input device 10C, and the power control circuit 10G, may be connected with the processing circuit 22A via a network.

The processing circuit 22A includes the acquisition function 20C, a recommended route generation function 22D, and the output control function 20E. The acquisition function 20C and the output control function 20E are the same as those in the first embodiment.

The recommended route generation function 22D includes the changed section determination function 20F, the specifying function 20G, the inflection point setting function 20H, a generation function 22I, and a joining point setting unit 22K. The recommended route generation function 22D is the same as the recommended route generation function 20D according to the first embodiment, except in that the generation function 22I is provided instead of the generation function 20I and in that the joining point setting unit 22K is further provided.

The processing functions of the processing circuit 22A are stored in the storage circuit 20B in a form of a computer executable program. The processing circuit 22A is a processor that reads out a computer program from the storage circuit 20B and executes the program to implement the function corresponding to the program.

The processing circuit 22A in a state of having read the programs have the functions in the processing circuit 22A illustrated in FIG. 10. In the description with reference to FIG. 10, a single processing circuit 22A implements the acquisition function 20C, the recommended route generation function 22D (the changed section determination function 20F, the specifying function 20G, the inflection point setting function 20H, the joining point setting unit 22K, and the generation function 22I), and the output control function 20E.

Functions different from the first embodiment are described in detail.

The joining point setting unit 22K is one example of a joining point setting unit. The joining point setting unit 22K sets one or a plurality of joining points in the changed section 30A. The joining point is a point where the recommended route 40 joins the changed section 30A.

Figure 11:
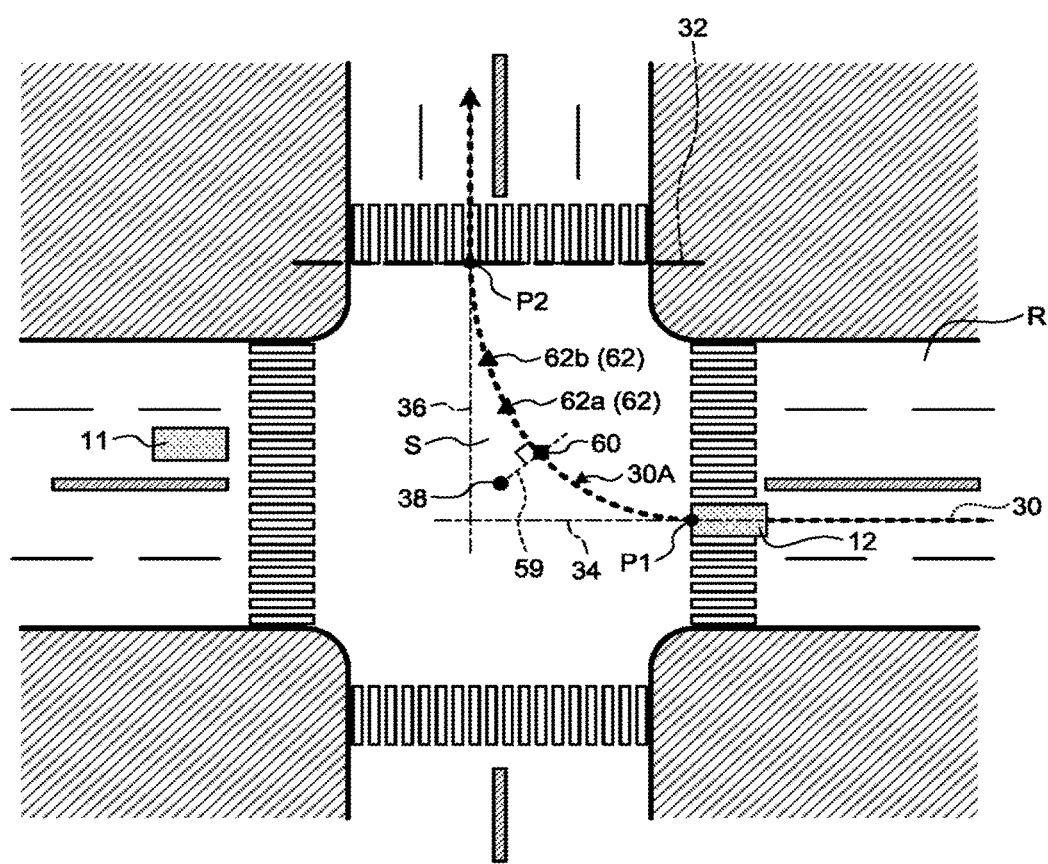
FIG. 11 is a diagram illustrating how a joining point is set.

FIG. 11 is a diagram illustrating how a joining point 62 is set. The joining point setting unit 22K acquires the changed section 30A, the first position P1, the second position 22, the exit line 32, and the inflection point from the changed section determination function 20F, the specifying function 20G, and the inflection point setting function 20H. The joining point setting unit 22K specifies an intersecting point 60 in the changed section 30A where a perpendicular line 59, extending from the inflection point 38 to the changed section 30A, intersects with the changed section 30A. The joining point setting unit 22K sets one or a plurality of joining points 62 in a portion between the intersecting point 60 and the second position P2, in the changed section 30A. In an example illustrated in FIG. 11, a joining point 62a and a joining point 62b are set in the portion between the intersecting point 60 and the second position 22, in the changed section 30A.

The joining point setting unit 22K may set at least one joining point 62 in the portion between the intersecting point 60 and the second position P2, in the changed section 30A. The joining point setting unit 22K may set three or more joining points 62 in the portion between the intersecting point 60 and the second position P2, in the changed section 30A. When a plurality of the joining points 62 is set, the joining points 62 may be set to be arranged side by side at an equal interval or at different intervals.

Referring back to FIG. 10, the generation function 22I is an example of the generation unit. The generation function 22I generates the recommended route 40.

Figure 12:
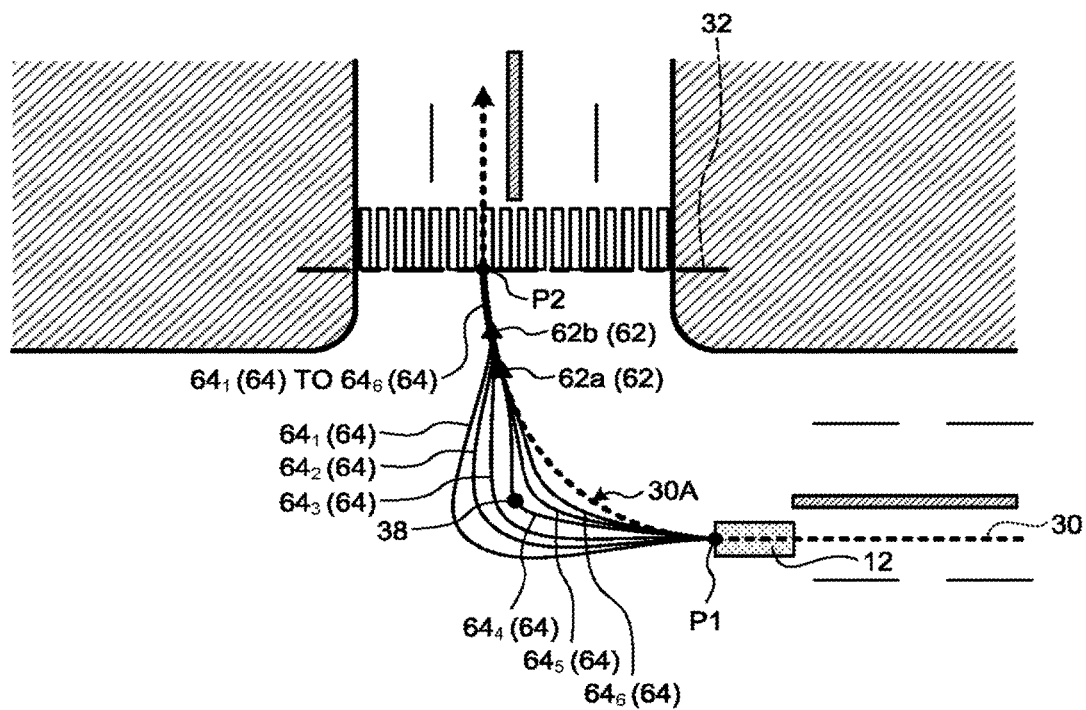
FIG. 12 is a diagram illustrating a recommended route.

FIG. 12 is a diagram illustrating an example of how the generation function 22I generates the recommended route 40. The generation function 22I generates a plurality of lines 64 extending from the first position P1 to the second position P2 via the joining points 62. More specifically, the generation function 22I generates the lines 64 each including a curved line smoothly connecting the first position P1 with the joining point 62 and a line connecting the joining point 62 with the second position P2. In other words, the generation function 22I generates the lines 64 in arch forms extending from the first position P1 to the second position P2 via the joining points 62. The lines 64 in arch forms are preferably formed in such a manner that the moving body 12 can smoothly travel thereon, for the sake of taking into consideration of driving performance of the moving body 12

In the example illustrated in FIG. 12, the generation function 22I generates: a plurality of lines 64 (lines $64_4$ to $64_6$) in arch forms extending from the first position P1 to the second position P2 via the joining point 62a; and a plurality of lines 64 (lines $64_4$ to $64_3$) in arch forms extending from the first position P1 to the second position P2 via the joining point 62b. The number of lines 64 extending from the first position P1 to the second position P2 via one joining point 62 is not limited to three and may be any number more than one.

The lines connecting the first position P1 with the joining point 62, in the lines 64, are lines in arch forms with different distances between the first position P1 and the joining point 62. The generation function 22I adjusts the radius of curvature of each of the lines in arch forms extending from the first position P1 to the joining point 62, and thus generates the lines 64 with different distances between the first position P1 and the joining point 62.

The lines connecting the first position P1 with the joining point 62, in the lines 64 generated by the generation function 22I, preferably passes through a protruding side (outer side) of the hanged section 30A in an arch form.

The generation function 22I may use the position of the moving body 12 entering the changed section 30A, as the first position P1. The position of the moving body 12 may be acquired from the sensor 10B (GPS).

The generation function 22I determines one of the generated lines 64 (the lines $64_1$ to $64_6$ in the example illustrated in FIG. 12) that passes through the inflection point 38 or comes closest to the inflection point 38, to be the recommended route 40. In the example illustrated in FIG. 12, the line $64_4$ comes closest to the inflection point 38 among the generated lines 64 (the lines $64_1$ to $64_6$). Thus, the generation function 22I determines the line $64_4$ to be the recommended route 40.

Figure 13:
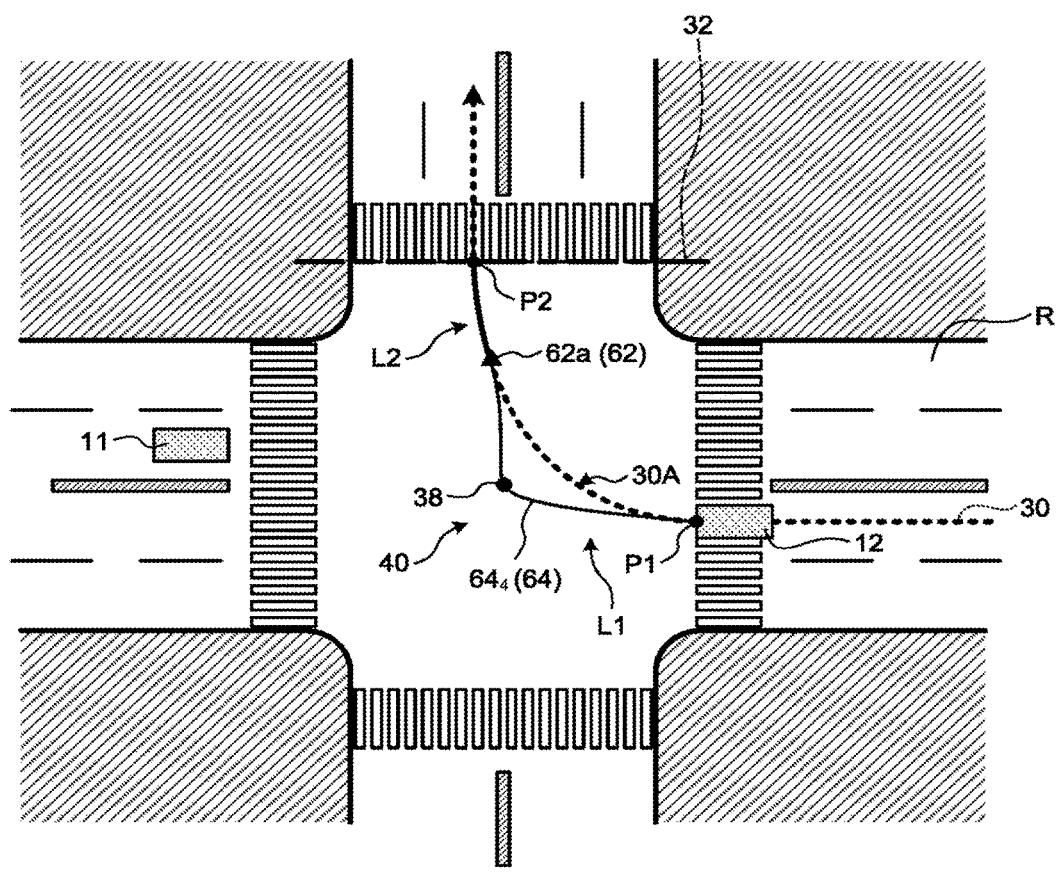
FIG. 13 is a schematic diagram illustrating the recommended route.

FIG. 13 is a schematic view illustrating an example of the determined recommended route 40. As illustrated in FIG. 13, the line $64_4$ has been determined to be the recommended route 40 by the generation function 22I. Thus, the generation function 22I generates the recommended route 40 including the first line L1 and the second line L2.

In other words, the recommended route 40 (line $64_4$) generated by the generation function 22I becomes the recommended route 40 including the first line L1 and the second line L2 described in the first embodiment.

The connecting point between the first line L1 and the second line L2 may not match the inflection point 38. In other words, the generation function 22I may generate as the recommended route 40, the line $64_4$, extending from the first position P1 to the second position P2 via the joining point (the joining point 62a in FIG. 13) while passing through the inflection point 38 or coming closest to the inflection point 38, and including the first line L1 and the second line L2 having the characteristics described Thus,in the present embodiment, the first position P1, the connecting point between the first line L1 and the second line L2, the joining point 62 (one joining point 62 on which the determined lines 64 pass), and the second position P2 are all present on the recommended route 40.

In the present embodiment, the recommended route generation function 22D generates the recommended route 40 by using the joining point 62 as described above.

Figure 14:
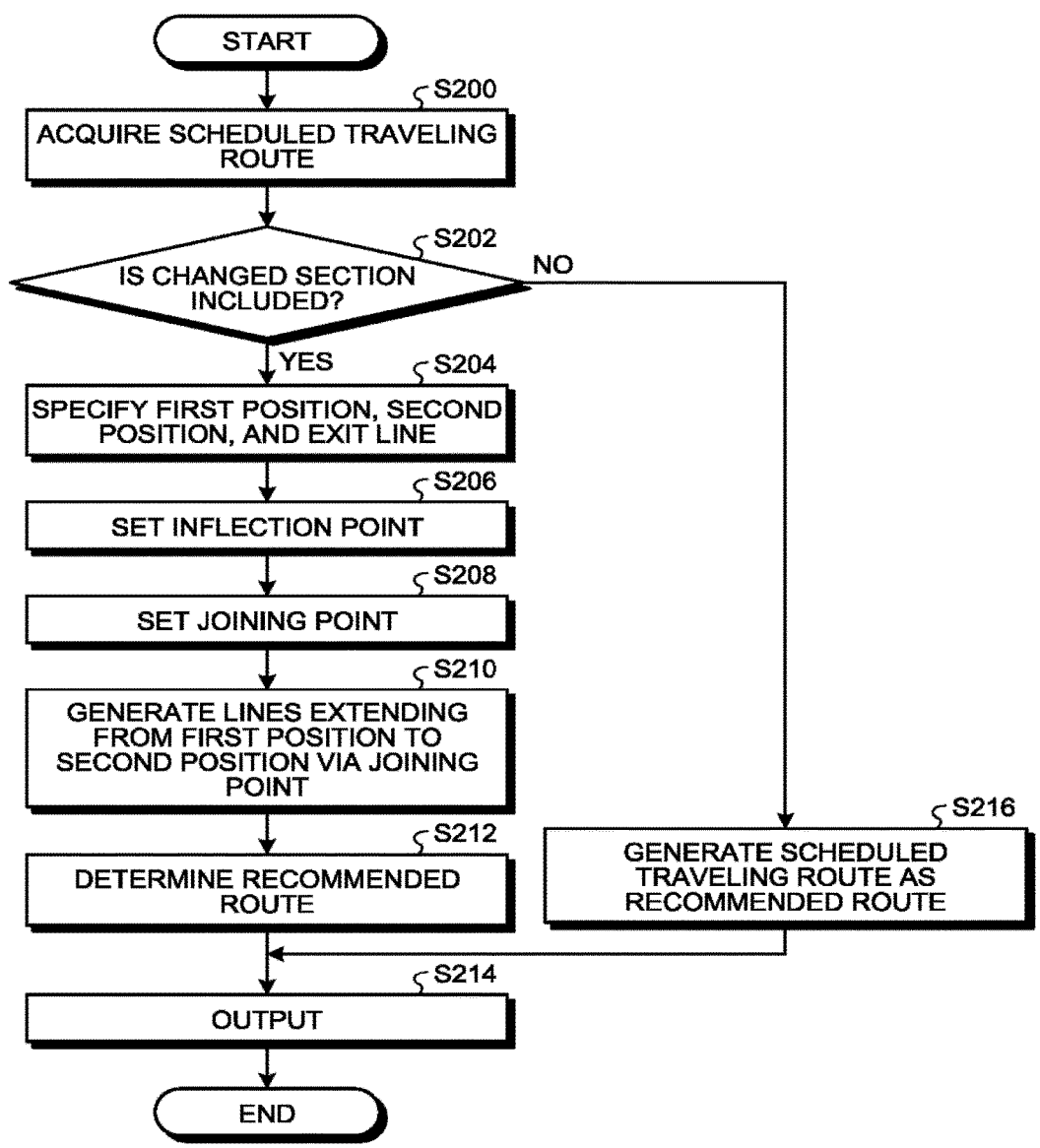
FIG. 14 is a flowchart illustrating a procedure of information processing.

Next, a procedure of the information processing executed by the processing circuit 22A will be described. FIG. 14 is a flowchart illustrating an example of the procedure of the information processing executed by the processing circuit 22A.

First of all, the acquisition function 200 acquires the scheduled traveling route 30 (step S200). The changed section determination function 20F then determines whether the scheduled traveling route 30, acquired at step S200, includes the changed section 30A (step S202). In this routine, the changed section determination function 20F determines whether the scheduled traveling route 30 includes the changed section 30A on the forward side of the moving body 12 in the traveling direction.

If the result of the determination at step S202 is positive (Yes at step S202), the processing proceeds to step S204. At step S204, the specifying function 20G specifies the exit line 32, the first position P1, and the second position P2 for the changed section 30A determined (specified) at step S202 (step S204).

The inflection point setting function 20F sets the inflection point 38 in the setting area S by using the exit line 32, the first position P1, and the second position P2 specified at step S204 for the changed section 30A specified at step S202 (step S206).

Next, the joining point setting unit 22K sets one or a plurality of joining points 62 (step S208). The generation function 22I then generates the lines 64 extending from the first position P1 to the second position P2 via the joining point 62 (step S210).

Next, the generation function 22I generates the recommended route 40 (step S212). At step S212, the generation function 22I determines one of the lines 64 generated at step S210 that passes through the inflection point 38 or comes closest to the inflection point 39, as the recommended route 40. The processing then proceeds to step S214.

If the result of the determination at step S202 is negative (No at step S202), the processing proceeds to step 16. At step S216, the scheduled traveling route 30 acquired at step S200 is determined as the recommended route 40 (step S216). Thus, when the scheduled traveling route 30 includes no changed section 30A, the recommended route generation function 22D directly uses the scheduled traveling route 30 as the recommended route 40. The processing then proceeds to step S214.

At step S214, the output control function 20E outputs the recommended route 40 generated at step S212 or S216 to at least one of the power control circuit 10G and the output circuit 10A (step S214). Thus, this routine is terminated.

As described above, the joining point setting unit 22K in the information processing device 22 according to the present embodiment sets the joining point 62 in a portion between the second position P2 and the intersecting point 60 where the perpendicular line 59, extending from the inflection point 38 to the changed section 30A, intersects with the changed section 30A. The generation function 22I determines one of the lines 64, extending from the first position P1 to the second position P2 via the joining point 62, coming closest to the inflection point 38, to be the recommended route 40. Thus, the generation function 22I generates the recommended route 40 including the first line L1 and the second line L2.

As described above, information processing device 22 according to the present embodiment generates the recommended route 40 with the changed section 30A, on the scheduled traveling route 30, including the first line L1 and the second line L2, by the method that is different from that in the first embodiment.

Thus, the information processing device 22 according to the present embodiment can achieve a higher traveling assist performance for the moving body 12, ac in the first embodiment.

Figure 15:
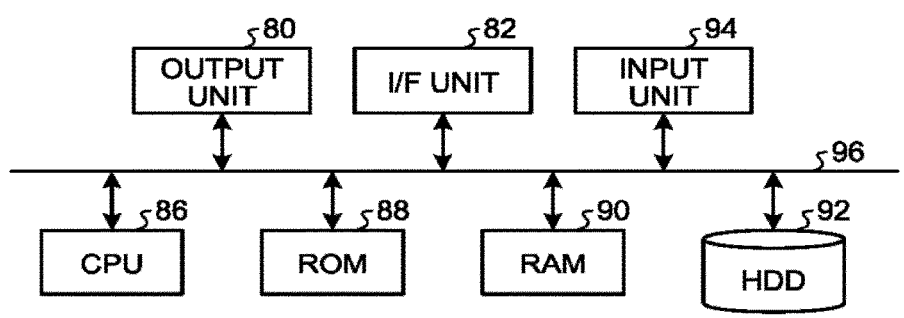
FIG. 15 is a diagram illustrating a hardware configuration of the information processing device.

Next, an example of a hardware configuration of the information processing device 20 and the information processing device 22 according to the embodiments are described. FIG. 15 illustrates the example of the hardware configuration of the information processing device 20 and the information processing device 22 according to the embodiments are described.

The information processing device 20 and the information processing device 22 according to the embodiments includes: a control device such as a central processing unit (CPU) 86; a storage device such as a read-only memory (ROM) 88, a random-access memory (RAM) 90, and a hard disk drive (HUD) 92; an I/F unit 82 as an interface for various devices; an output unit 80 that outputs various types of information such as the output information; an input unit 94 that receives an operation of a user; and a bus 96 that connects among the components. The hardware configuration employs a general computer.

In the information processing device 20 and the information processing device 22 according to the embodiments, the CPU 86 loads a computer program from the ROM 88 onto the RAM 90 and executes the program, so that the corresponding function is implemented on the computer.

The program, for executing each processing executed by the information processing device 20 and the information processing device 22 according to the embodiments may be stored in the HUD 92. The program for executing the processing executed by the information processing device 20 and the information processing device 22 according to the embodiments may also be embedded in the ROM 88 in advance and provided.

The program for executing the processing by the information processing device 20 and the information processing device 22 according to the embodiments may also be in a form of a file of a format that can be installed or executed, and may be stored in a computer readable storage medium such as a CD-ROM, a CD-R, a memory card, a digital versatile disc (DVD), or a flexible disk (FD), to be provided as a computer program product. The program for executing the processing executed by the information processing device 20 and the information processing device 22 according to the embodiments may be stored in a computer connected to a network such as the Internet, and may be provided by downloading via the network. The program for executing the processing executed by the information processing device 20 and the information processing device 22 according to the embodiments may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory: and
processing circuitry configured to operate as:
a recommended route generation unit configured to generate a recommended route with a changed section on a scheduled traveling route, the changed section representing a curve within a predetermined radius of curvature, the changed section including a first line that continues to a first position at an entrance of the changed section, and a second line that continues to a second position at an exit of the changed section, the second line being longer than the first line, a tangential line of the second line and an exit line of the changed section forming an angle within a predetermined angle range.

2. The information processing device according to claim 1, wherein the exit line passes through the second position and is orthogonal to a traveling direction after exiting the changed section on the scheduled traveling route.

3. The information processing device according to claim 1, wherein the predetermined angle range is a range including 90°.

4. The information processing device according to claim 1, wherein the changed section involves at least one of a right-turn curve, a left-turn curve, and a curve within a predetermined radius of curvature on the scheduled traveling route.

5. The information processing device according to claim 1, wherein the second line has a larger radius of curvature than the radius of curvature of the changed section with an arch form on the scheduled traveling route.

6. The information processing device according to claim 1, wherein
the recommended route generation unit includes a changed section determination unit configured to determine whether the changed section exists on a forward side of a moving body in the traveling direction, and
the recommended route generation unit generates the recommended route when the changed section is determined to exist.

7. The information processing device according to claim 1, wherein the recommended route generation unit includes:
an inflection point setting unit configured to set an inflection point in a setting area defined by: a line that passes through the first position and extends in an entering direction toward the changed section; a line that passes through the second position and extends along the traveling direction after exiting the changed section; and the changed section with an arch form on the scheduled traveling route; and
a generation unit configured to generate the recommended route with the changed section including the first line and the second line, by generating a line connecting the first position with the inflection point and a line connecting the inflection point with the second position.

8. The information processing device according to claim 7, wherein the inflection point setting unit is configured to set no inflection point when the changed section with an arch shape on the scheduled traveling route has a radius of curvature that is a certain reference value or smaller.

9. The information processing device according to claim 7, wherein the inflection point setting unit sets the inflection point at a position in the setting area, farther from the exit line when another moving body exists in a direction extending along the entering direction toward the changed section from the first position, compared with a case where no other moving body exists.

10. The information processing device according to claim 1, wherein the recommended route generation unit includes:
an inflection point setting unit configured to set an inflection point in a setting area defined by: a line that extends from the first position in an entering direction toward the changed section; a line that extends from the second position in a direction opposite to the traveling direction after exiting the changed section; and the changed section with an arch form on the scheduled traveling route;
a joining point setting unit configured to set a joining point in a portion in the changed section between the second position and an intersecting point where a perpendicular line, extending from the inflection point to the changed section, intersects with the changed section; and
a generation unit configured to generate the recommended route including the first line and the second line by determining, to be the recommended route, one of a plurality of lines, extending from the first position to the second position via the joining point, that comes closest to the inflection point.

11. The information processing device according to claim 10, wherein the generation unit is configured to use a position of a moving body at the entrance of the changed section as the first position.

12. An information processing method comprising generating a recommended route with a changed section on a scheduled traveling route, the changed section representing a curve within a predetermined radius of curvature, the changed section including a first line that continues to a first position at an entrance of the changed section, and a second line that continues to a second position at an exit of the changed section, the second line being longer than the first line, a tangential line of the second line and an exit line of the changed section forming an angle within a predetermined angle range.

13. The information processing method according to claim 12, wherein the exit line passes through the second position and is orthogonal to a traveling direction after exiting the changed section on the scheduled traveling route.

14. The information processing method according to claim 12, wherein the predetermined angle range is a range including 90°.

15. The information processing method according to claim 12, wherein the changed section involves at least one of a right-turn curve, a left-turn curve, and a curve within a predetermined radius of curvature on the scheduled traveling route.

16. The information processing method according to claim 12, wherein the second line has a larger radius of curvature than the radius of curvature of the changed section with an arch form on the scheduled traveling route.

17. The information processing method according to claim 12, wherein
generating of the recommended route includes determining whether the changed section exists on a forward side of the moving body in the traveling direction, and
generating of the recommended route generates the recommended route when the changed section is determined to exist.

18. The information processing method according to claim 12, wherein generating of the recommended route includes:

setting an inflection point in a setting area defined by: a line that passes through the first position and extends in an entering direction toward the changed section; a line that passes through the second position and extends along the traveling direction after exiting the changed section; and the changed section with an arch form on the scheduled traveling route; and generating the recommended route with the changed section including the first line and the second line, by generating a line connecting the first position with the inflection point and a line connecting the inflection point with the second position.

19. The information processing method according to claim 18, wherein setting of the inflection point sets no inflection point when the changed section with an arch shape on the scheduled traveling route has a radius of curvature that is a certain reference value or smaller.

20. A moving body comprising:
a memory: and
processing circuitry configured to operate as:
  a recommended route generation unit configured to generate a recommended route with a changed section on a scheduled traveling route, the changed section representing a curve within a predetermined radius of curvature the changed section including a first line that continues to a first position at an entrance of the changed section, and a second line that continues to a second position at an exit of the changed section, the second line being longer than the first line, a tangential line of the second line and an exit line of the changed section forming an angle within a predetermined angle range; and
  an output control unit configured to output the recommended route to a power control unit configured to control a power unit of the moving body.

21. An information processing device comprising:
a memory: and
processing circuitry configured to operate as:
  a recommended route generation unit configured to generate a recommended route with a changed section on a scheduled traveling route for a vehicle traveling on a road, the changed section representing a curve within a predetermined radius of curvature, the recommended route being defined by a first line that continues to a first position at an entrance of the changed section, and a second line that continues to a second position at an exit of the changed section, the second line being longer than the first line, a tangential line of the second line and an exit line in the changed section forming an angle within an angle range of 90° ±10°, the exit line being a straight line that passes through the second position as an end portion on a downstream side of the traveling direction of the vehicle in the changed section and that is orthogonal to the traveling direction after exiting the changed section on the scheduled traveling route.

* * * * *